No. 731,518. PATENTED JUNE 23, 1903.
J. J. SNIGO.
ICE CREAM PACKING CAN.
APPLICATION FILED OCT. 9, 1902.
NO MODEL. 2 SHEETS—SHEET 1.
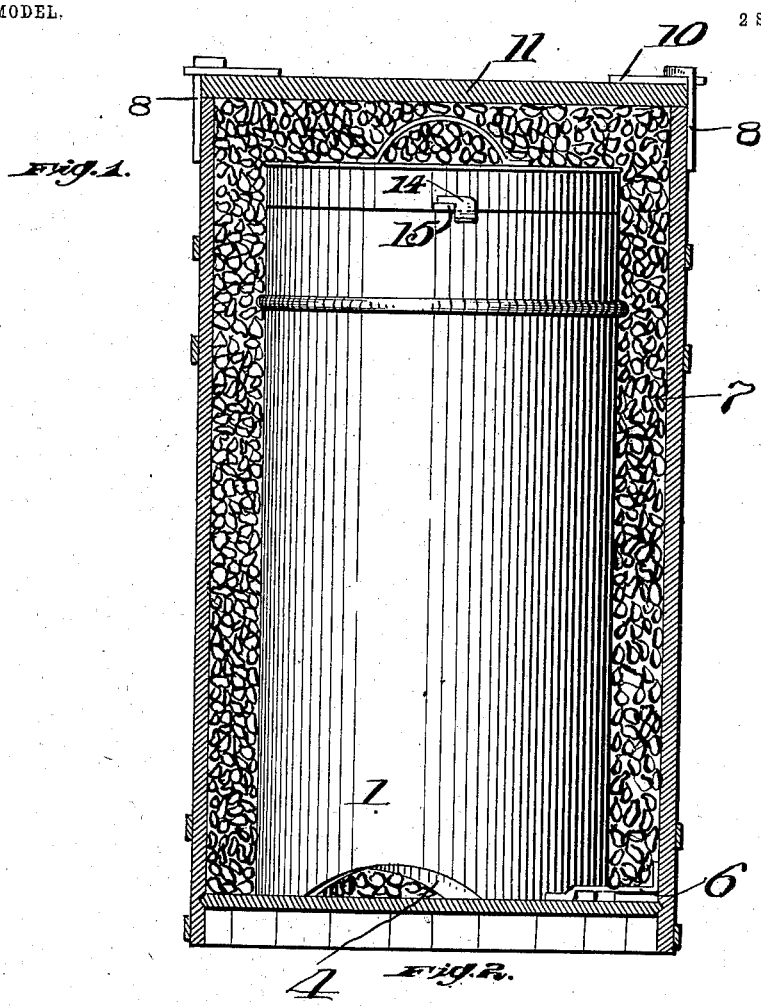
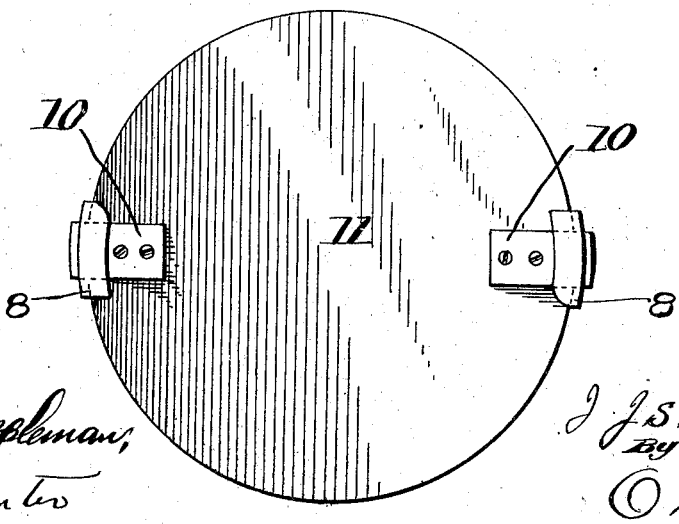

No. 731,518. PATENTED JUNE 23, 1903.
J. J. SNIGO.
ICE CREAM PACKING CAN.
APPLICATION FILED OCT. 9, 1902.
NO MODEL. 2 SHEETS—SHEET 2.
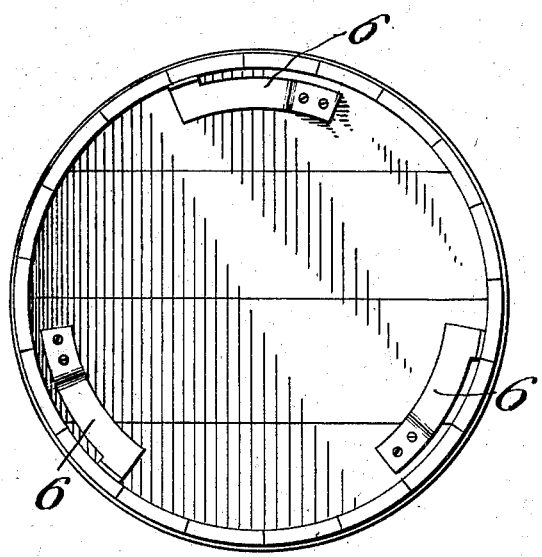
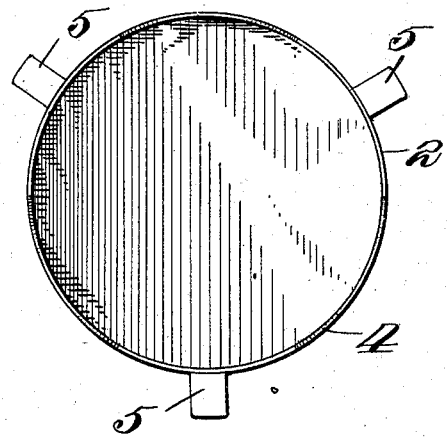
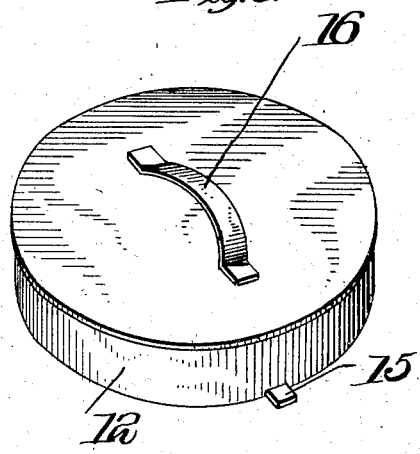
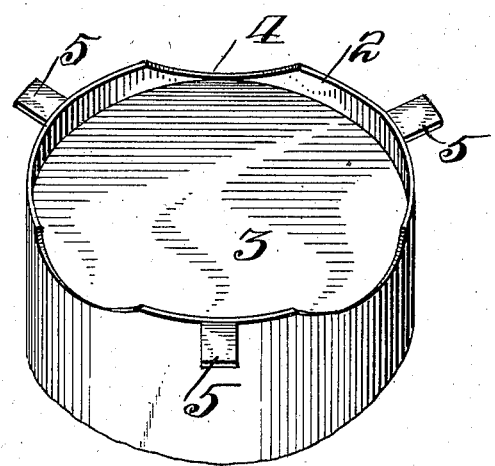
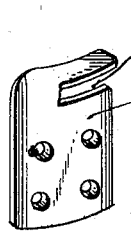
Witnesses:
J. P. Appleman
M. Hunter
Inventor
J. J. Snigo
By O. D. Levis
Att'y.

No. 731,518.

Patented June 23, 1903.

UNITED STATES PATENT OFFICE.

JAMES J. SNIGO, OF PITTSBURG, PENNSYLVANIA.

ICE-CREAM-PACKING CAN.

SPECIFICATION forming part of Letters Patent No. 731,518, dated June 23, 1903.

Application filed October 9, 1902. Serial No. 126,404. (No model.)

*To all whom it may concern:*

Be it known that I, JAMES J. SNIGO, a citizen of the United States, residing at Pittsburg, in the county of Allegheny and State of Pennsylvania, have invented a new and useful Improvement in Ice-Cream-Packing Cans, of which improvement the following is a specification.

This invention relates to certain new and useful improvements in ice-cream-packing cans, and relates more particularly to vessels in which the ice-cream is stored and shipped.

The present invention has for its object the provision of novel means whereby a uniform circulation is obtained around the ice-cream can, thereby freezing the cream in a uniform manner throughout the entire can.

The present invention further aims to provide novel means for fastening the ice-cream can in the vessel and also employ like means for securing the lid upon the can and the cover upon the vessel.

The invention still further contemplates to provide a device of this character which will be extremely simple in construction, strong, durable, comparatively inexpensive to manufacture, and highly efficient in its use.

With the above and other objects in view the invention consists in the novel construction, combination, and arrangement of parts to be hereinafter more fully described, and specifically pointed out in the claim.

In describing the invention in detail reference is had to the accompanying drawings, forming a part of this specification, and wherein like numerals of reference indicate like parts throughout the several views, in which—

Figure 1 is a vertical sectional view of my improved ice-cream-packing can. Fig. 2 is a top plan view thereof. Fig. 3 is a similar view with the cover removed therefrom. Fig. 4 is an under plan view of the ice-cream can. Fig. 5 is a perspective view of the lid secured to the upper portion of the can. Fig. 6 is an inverted fragmentary perspective view of the lower portion of the can. Fig. 7 is a perspective view of one of the guides secured to the lower portion of the vessel. Fig. 8 is a perspective view of one of the clamps secured to the upper end of the vessel.

In the drawings the reference-numeral 1 represents the ice-cream can, the sides of which form flanges 2, extending below the bottom 3. In said flanges are formed cut-away portions 4 for the purpose of allowing the ice and water to come in contact with the under face of the bottom 3. These flanges 2 also have formed integral therewith outwardly-extending lugs 5, said lugs engaging under clamps 6, secured to the inner face of the packing-can 7, said can carrying at its upper end clamps 8, having notches 9 formed therein to receive the lugs 10, carried by the cover 11.

The reference-numeral 12 represents the lid of the can 1, carrying hook members 14, the latter being adapted to engage under lugs 15, formed upon the upper end of the body portion of the can 1. The handle 16 is rigidly secured to the upper face of the lid 12 and may be of any suitable construction.

The clamps 6 comprise metallic strips secured at their one end to the bottom of the packing-can and being formed at their other ends into right-angular extensions which are secured to the side walls of the said can at a point above the bottom thereof.

It will be noted that many advantages are obtained by packing cream according to my improvements, as the same will allow the cold air to circulate freely around all parts of the can, which will assure the cream to be frozen in a uniform manner throughout the entire can. This is particularly desirable not only in ice-creams frozen in bulk, but in cases where bricks of cream are shipped or in cases where it is desired to retain frozen ices for a long period of time.

The many other advantages obtained by the use of my improved device will be readily apparent from the foregoing description, taken in connection with the accompanying drawings.

It will be noted that various changes may be made in the details of construction without departing from the general spirit of my invention.

Having fully described my invention, what I claim as new, and desire to secure by Letters Patent, is—

In a device of the type set forth the combination with the packing-can, and clamps comprising metallic strips secured at their one end to the bottom of the said can and having their other ends secured to the side of the can at a point above the bottom thereof, of an ice-cream can arranged in the said first-named can, outwardly-projecting lugs formed integral with the said last-named can, said lugs being adapted to be received beneath the said clamps, covers for the said cans, and means for securing the said covers in position, substantially as and for the purpose specified.

In testimony whereof I have hereunto signed my name in the presence of two subscribing witnesses.

JAMES J. SNIGO.

In presence of—
JOHN GROETZINGER,
M. HUNTER.